United States Patent [19]

Sehr

[11] Patent Number: 4,693,598
[45] Date of Patent: Sep. 15, 1987

[54] OPTO-ELECTRONIC MEASURING RECEIVER AND METHOD FOR CONTROLLING THE OPTO-ELECTRONIC MEASURING RECEIVER

[75] Inventor: Willibald Sehr, Waldbrunn-Ellar, Fed. Rep. of Germany

[73] Assignee: MOBA-Electronic Gesellschaft fur Mobil-Automation mbH, Hadamar, Fed. Rep. of Germany

[21] Appl. No.: 827,166

[22] Filed: Feb. 7, 1986

[30] Foreign Application Priority Data

Feb. 22, 1985 [DE] Fed. Rep. of Germany ....... 3506304

[51] Int. Cl.[4] .......................... G01C 3/08; G01B 11/00
[52] U.S. Cl. .......................................... 356/4; 33/293; 356/400
[58] Field of Search ........................ 356/4, 400; 33/293

[56] References Cited

U.S. PATENT DOCUMENTS

| | | | |
|---|---|---|---|
| 3,012,469 | 12/1961 | Clayborne | 356/400 |
| 3,649,122 | 3/1972 | Holtz | 356/4 |
| 3,894,230 | 7/1975 | Rorden et al. | 356/400 |
| 3,972,622 | 8/1976 | Mason et al. | 356/400 |

Primary Examiner—Stephen C. Buczinski
Attorney, Agent, or Firm—Kinzer, Plyer, Dorn, McEachran & Jambor

[57] ABSTRACT

The present invention relates to an opto-electronic measuring receiver for determining the relative position of the measuring receiver with respect to a radiation plane established by an optical transmitter. The measuring receiver comprises a plurality of opto-electronic receiving units for generating an output signal indicative of the impingement of the radiation plane on a respective receiving unit. Known opto-electronic measuring receivers having a great number of receiving units require a correspondingly extensive circuitry. For avoiding this disadvantage, the invention provides that each receiving unit is connected to a controlled commutator element, that there is provided a control circuit in connection with the commutator elements, that the first and second outputs of each commutator element are connected respectively to the first and second inputs of the control circuit, and that the control circuit includes memory means for storing an information relating to any one of the receiving units.

8 Claims, 1 Drawing Figure

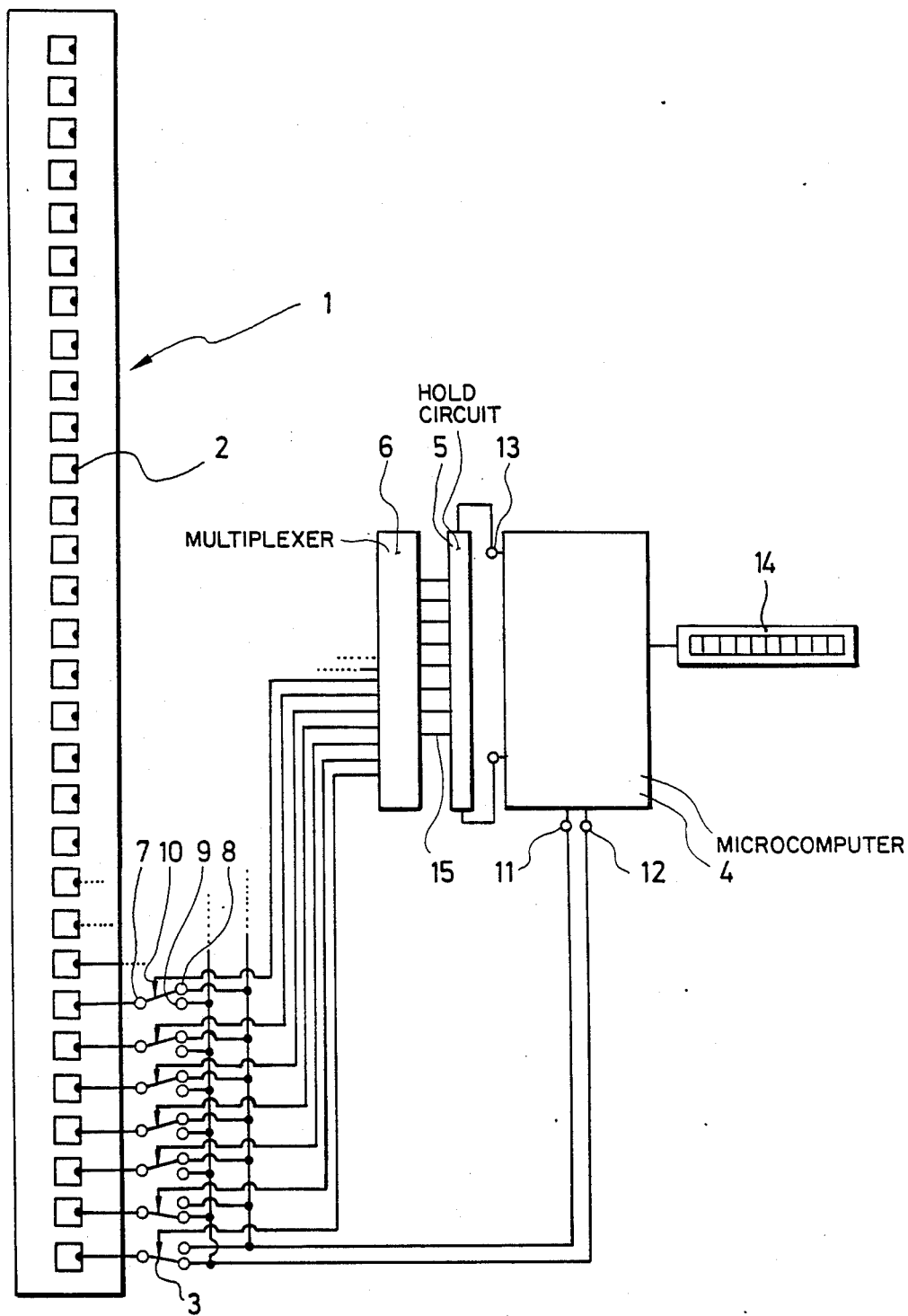

OPTO-ELECTRONIC MEASURING RECEIVER AND METHOD FOR CONTROLLING THE OPTO-ELECTRONIC MEASURING RECEIVER

DESCRIPTION

The present invention relates to an opto-electronic measuring receiver and to a method for controlling same.

In particular, the present invention relates to an opto-electronic measuring receiver for determining the relative position of the measuring receiver with respect to a radiation plane defined by a rotating laser beam emitted by a laser transmitter. Laser transmitters for establishing a reference radiation plane have recently been employed to an increasing degree in the fields of civil engineering, agriculture, and surveying. The associated measuring receivers are generally operative to display or indicate the level of the measuring receiver, at which a receiving unit thereof is impinged on by the radiation plane to thus indicate the relative position of the measuring receiver with respect to the radiation plane.

A known opto-electronic measuring receiver for determining the relative position of the measuring receiver with respect to such a radiation plane generated by a laser transmitter, which is already used in construction machinery, comprises a plurality of photodiodes disposed in a row and individually connected to a light emitting diode through a separate hold and amplifyer circuit. In this known opto-electronic measuring receiver, when the laser beam impinges on one of the photodiodes, the light emitting diode associated to this photodiode is illuminated. An operator may then determine the relative position of the measuring receiver with respect to the radiation plane established by the laser transmitter from the position of the respective light emitting diode along a light emitting diode display chain. The known measuring receiver has a number of shortcomings, however, which make it appear insufficient for meeting the increased requirement in the field of modern surveying art. A first, and considerable, shortcoming of this measuring receiver results from its limited measuring range, i.e. from the relatively short length of the row of photodiodes forming the receiving units. An arbitrary extension of the measuring range of the known measuring receiver is out of the question, as this would entail a corresponding increase of the number of photodiodes and thus of the number of circuits associated to the individual photodiodes. In the known opto-electronic measuring receiver, the overall amount of circuitry components would thus increase in proportion to the number of the photodiodes, until finally the cost of such an opto-electronic measuring receiver would become prohibitively high. Furthermore, in the known opto-electronic measuring receiver the individual receiving units formed by the photodiodes have to be disposed closely adjacent one another with no gaps therebetween. An enlargement of the spacing between two receiver units of the known measuring receiver is likewise out of the question because of the possibility that the laser beam then impinges thereon between two receiver units, in which case the known measuring receiver would be unable to indicate its relative position with respect to the laser beam generated by the laser transmitter. Having regard to the fact, however, that a photodiode receiver unit has extremely small dimensions of a magnitude of only a few millimeters, the known measuring receiver requires a very great number of photodiodes to establish even a relatively short measuring range of a magnitude of for instance 50 cm. A further shortcoming of the known measuring receiver results from the fact that its output signal does not represent a value proportional to the measured position, as would be desirable in many applications.

In view of this state of the art, it is an object of the present invention to improve an opto-electronic measuring receiver of the type defined in the introduction in such a manner as to cover a wide measuring range with a reduced amount of circuitry and to permit the output signal of the measuring receiver to be employed for directly indicating the relative position of the measuring receiver with respect to the radiation plane established by the optical transmitter.

This object is attained by an opto-electronic receiver of this type, wherein each receiving unit is connected to the input of a controlled commutator element having an input, two outputs, and a control input, wherein a control circuit is provided and connected to the control inputs of said commutator elements for controlling the switching state thereof, wherein one output of each commutator element is connected to a first input of said control circuit, wherein the other output of each commutator element is connected to a second input of said control circuit, and wherein said control circuit includes memory means adapted to have an information regarding a receiving unit stored therein.

The construction of the claimed measuring receiver permits the employ of a very great number of receiving units without this entailing a corresponding increase of the required circuitry. Doubling of the number of receiving units would thus merely require doubling of the number of the associated commutator elements, with the remaining circuitry remaining unchanged. The requirement of a great number of commutator elements does not pose any problem in view of modern techniques, as there are integrated circuits commercially available containing a multitude of commutator elements on a single chip. The employ of memory means for storing an information regarding a receiving unit opens completely new possibilities for the arrangement of the receiving units. This is because when the control circuit has stored an information indicative of the address, the serial number or the position of the receiving unit that has generated the last output signal indicative of the impingement of the laser beam on the respective receiving unit, the stored information can be employed as the measuring information for an interval during which none of the receiving units senses the impingement of the laser beam, as the latter momentaneously impinges on the space between two receiving units. In other words, as long as the information indicative of the receiving unit last impinged on by the radiation is memorized, and as long as none of the neighbouring receiving units senses the impingement of the radiation plane thereon, one can be sure that the laser beam just impinges on the space between the receiving unit activated last and one of the immediately adjacent receiving units. This insensibility with regard to momentaneous interruptions in the sensing of the laser beam enables the spacing between the receiving units to be enlarged so as to leave free spaces between adjacent receiving units. In an opto-electronic measuring receiver of the kind disclosed, it is thus possible to cover a relatively long measuring range even with a reduced number of receiving units having a small surface area. In the construction according to the invention, the number of the receiving units required is thus solely determined by the required measuring resolution or measuring accuracy, respectively. A further advantage of the measuring receiver according to the invention resides in the fact that the stored information indicative of a respective receiving unit may be directly employed for providing a proportional measuring signal, as long as this information is so selected that it is directly proportional to the position of the respective receiving unit along the row of receiving units.

According to a preferred embodiment, the control circuit comprises a microcomputer. The employ of a commercially available microcomputer for the control circuit is rendered possible by the fact that due to the construction of the measuring receiver according to the invention, the control circuit is required to have only two measuring inputs instead of a number of inputs corresponding to that of the receiving units.

The connection between the microcomputer and the commutator elements is advantageously established by utilizing a holding circuit having an output corresponding to data bit, as this construction on the one hand permits the employ of commercially available circuit elements and and on the other hand results in a particularly simple structure of the circuit. A further advantage of this circuit structure resides in the fact that a number of commutator elements can be selected in a simple manner by introducing into the hold circuit a data word providing a direct digital representation of the binary number corresponding to the number of commutator elements to be selected. If for instance the lowermost eleven receiving units are to be connected to the first input, while the remaining receiving units from the twelfth receiving unit onwards are to be commutated to the second input, all that is required is to introduce the digital representation of the numeral "11" into the hold circuit, that is, the serial data word 00001011. This word appears in parallel representation at the output of the hold circuit and is converted to the required n of m representation in the multiplexer circuit.

An advantageous method for controlling the claimed optoelectronic measuring receiver is. This method leads to a rapid and reliable identification of the receiving unit the output signal of which indicates the impingement thereon of the radiation plane.

The relative position may be determined in a particularly simple manner by permitting the opto-electronic measuring receiver to be operated in a holding loop when the radiation plane continuously impinges on the same receiving unit. This condition is monitored by the control circuit of the opto-electronic measuring receiver by repetitively commutating the respective receiving unit and by sensing whether this commutation results in a repetitive change of signal at the two inputs of the control circuit. As long as this is the case, the position of the measuring receiver relative to the radiation plane remains unchanged and corresponds to the stored information.

Also, the stored information may be advantageously "frozen" as long as none of the receiving units senses the impingement thereon of the radiation. This case corresponds to the above discussed condition in which the radiation of the laser transmitter impinges on the space between two adjacent receiving units.

A preferred embodiment of the invention shall now be described by way of example with reference to the accompanying drawings, the only FIGURE of which represents a block diagram of an opto-electronic measuring receiver according to the invention.

A measuring receiver 1 has a plurality of opto-electronic receiving units 2 in the form for instance of photo-transistors or photo-diodes arranged in a row configuration. The receiving units 2 serve for detecting a radiation plane established by a rotating laser transmitter (not shown). The laser beam usually rotates at a speed of five to ten revolutions per second. This corresponds to a dwell time of the laser beam on the receiving surface of the photo-transistor or the photo-diode of a magnitude of a few milliseconds. The number of the receiving units 2 employed preferably lies between twenty and two hundred. Each receiving unit 2 is connected to the terminal 7 of a switching assembly including a commutator element 3. The commutator element 3 may be an electronic switch, a preferred embodiment being equipped with integrated circuits containing a plurality of commutator elements.

Each commutator element 3 of each switching assembly is associated with two discrete switch assembly outputs 8 and 9, and a control input 10. Depending on the potential applied to the control input, the input 7 of commutator element 3 is conected either to first output 8 or second output 9. A microcomputer 4 has a first and a second input 11 and 12, respectively. One output 8 of each commutator element 3 is connected to first input 11 of microcomputer 4, while the other output 9 of each commutator element 3 is connected to second input 12 of microcomputer 4. Microcomputer 4, which may be any commercially available type, for instance of the type known as "Intel 8031", has a serial data output 13 to which a hold circuit 5 is connected. Hold circuit 5, which is preferably of the type known as "Intel 4093", may be supplied with a serial data output word appearing at the serial data output 13 of microcomputer 4. Hold circuit 5 has a number of outputs 15 corresponding to the number of bits of the serial data output word. The outputs 15 of hold circuit 5 are connected to a multiplexer circuit 6 of the type for instance known as "Intel 4053", which converts the parallel data word appearing at outputs 15 into an "n of m" code. At the output side multiplexer circuit 6 is connected to the control inputs 10 of commutator elements 3. Also connected to microcomputer 4 is a digital display unit 14 adapted to display the relative position of measuring receiver 1 with respect to the radiation plane established by the optical transmitter.

The microcomputer includes a fixed value memory storing a sequential control program whereby it is controlled in such a manner that in a first step it causes part of the receiving units 2 to be commuted to its first input 11, and another part of the receiving units 2, to its second input 12. In a second step, the microcomputer scans the signals applied to its inputs 11 and 12 to determine the part of the receiving units containing the receiving unit on which the laser beam impinges. The microcomputer preferably starts by commuting the upper half of the receiving units to its first input, and the lower half of the receiving units, to its second input. If the microcomputer then determines that a "high" signal is present for instance at its first input 11, it commutates the lowermost receiving unit of the upper half of the number of receiving units from its first input 11 to its second input 12. This commutation of the respective lowermost receiving units 2 from its first input 11 to its second input 12 is repeated by the microcumputer 4 until there is a change of signal at its inputs 11, 12. The data word supplied to the hold circuit at this instance corresponds to the address or serial number of the respective receiving unit sensing the laser beam. The microcomputer stores this data word and multiplies it by a value corresponding to the spacing between adjacent receiving units 2. The result is displayed by the display unit 14 to indicate the relative position of measuring receiver 1 with respect to the radiation plane.

The microcomputer 4 then commutates the thus determined receiving unit 2 alternately between its inputs 11 and 12 as long this commutation results in a change of signal at the inputs. As long as this is the case, it is ensured that the respective receiving unit continually senses the laser beam. When the commutation does no longer result in a change of signal, the microcomputer 4 returns to the above described sequential determination of the respective receiving unit 2.

When a "high" signal is not detected at either of the two inputs 11 and 12, i.e. when none of the receiving units 2 senses the laser beam, microcomputer 4 leaves the stored information unchanged, as in this case it is certain that the laser beam has left the receiving unit 2 on which it had impinged before, but has not yet impinged on the adjacent receiving unit. It is only when another receiving unit senses the laser beam that the stored information is updated to the actually prevailing state.

When microcomputer 4 fails to receive a signal from any of the receiving units for a certain time, an error signal may be generated to indicate for instance the absence or an interruption of the laser beam.

The digital information indicating the receiving unit actually sensing the laser beam may also be used for controlling the operation of a machine.

It is also possible that the microcomputer executes a statistical evaluation of the measuring results, i.e. if the laser beam for instance oscillates so as to sway back and forth over a certain number of receiving units, a statistical evaluation would permit the respective "median" receiving unit to be determined.

It is further possible to store an information indicating that the laser beam has left the measuring range upwards or downwards, i.e. that it lies above the uppermost or below the lowermost receiving unit, respectively.

Instead of using a single substantially vertical row of receiving units, it may also be feasible to employ three rows of receiving units offset from one another by an angle of 120° in a three-dimensional arrangement so as to permit the radiation to be received from all sides. In this case the receiving units disposed at a common level are connected in parallel to the input 7 of a common commutator element 3.

The hold circuit is preferably an 8 bit latch of the type embodied in commercially available 8 bit microcomputers.

It is likewise possible to derive the output signal in the form of an analogue signal when an analogue display or the analogue control of a machine is desired.

The level-proportional output signal may selectively be employed in analogue or digital form as a display signal or in the form of an actual value signal for a control operation.

The display unit may be embodied in a numeral display unit, a pointer display unit, or in a chain of light emitting diodes.

I claim:

1. An opto-electronic receiver combined with switching assemblies and a control circuit for determining the relative position of the receiver with respect to a radiation plane produced by an optical transmitter, comprising:
    a plurality of opto-electronic receiving units (2) disposed in a row, each opto-electronic receiving unit generating an output signal upon impingement of said radiation plane on a respective opto-electronic receiving unit;
    each receiving unit being connected to a respective terminal (7) of switching assemblies, each switching assembly further having two discrete outputs (8,9), a switching element (3) and a control input (10), with each switching element (3) connected to a respective terminal (7) to receive an output signal therefrom when generated, each switching element having its own control input (10) and switchable thereby to one or the other output (8,9) to deliver the output signal thereto;
    a control circuit connected to said control inputs (10) of said switching assemblies for controlling the respective switching conditions thereof;
    one output of each switching assembly being connected to a first input (11) of said control circuit, the other output of each switching assembly being connected to a second input (12) of said control circuit; and
    said control circuit including memory means for storing data designating one receiving unit among said plurality of receiving units.

2. The combination claimed in claim 1, wherein said control circuit includes a microcomputer.

3. The combination claimed in claim 2, wherein said control circuit further includes a hold circuit (5) adapted for receiving and storing a data output word generated by said microcomputer indicative of the receiving unit impinged by radiation, said hold circuit having a number of outputs (15) corresponding to the number of bits of the data output word.

4. The combination claimed in claim 3, wherein the outputs of said hold circuit are connected to a multiplexer circuit (6), the outputs of which are respectively connected to said control inputs (10) of said switching assemblies.

5. A method of operating the combination claimed in claim 1, including the steps of:
    (a) causing said switching assemblies to connect part of said receiving units to the first input of said control circuit and the remaining part of said receiving units to the second input of said control unit;
    (b) determining from said first and second inputs whether the signal from the receiving unit on which said radiation plane impinges is contained in the one or is contained in the remaining part of said receiving units;
    (c) switching successively, one after the other, the switching elements of the respective receiving units of the part determined in step (b) to the other input of the control circuit;
    (d) detecting from the successive switching of step (c) when the signal indicative of the presence of the radiation plane changes from the one input to the second input of the control circuit; and
    (e) storing data in said control circuit the receiving unit detected as a result in a change of signal between said inputs.

6. A method as claimed in claim 5 including the step of using said control circuit to calculate the relative position of said detected receiver unit with respect to the radiation plane from said stored data and from the spacing of the respective receiving units from one another.

7. A method as claimed in claim 5 including the following steps, after completing step (e):

(f) alternately switching the receiving unit detected by step (d) to the first and second inputs of the control circuit;

(g) continuing step (f) as long as the switching of step (f) results in a change of signal at said first and second inputs, signifying the detected receiving unit continues to be impinged; and (h) returning to step (a) when step (g) no longer results in a change of signal at said first and second inputs.

8. A method as claimed in claim 7, in which said stored data are maintained unchanged when step (b) shows that none of said receiving units is impinged on by said radiation plane.

* * * * *